United States Patent [19]

Tung

[11] Patent Number: 4,769,766

[45] Date of Patent: Sep. 6, 1988

[54] ROBUST MODEL REFERENCE CONTROLLER

[76] Inventor: Hsien-Hsin Tung, 1826 N. Gate Rd., Scotch Plains, N.J. 07076

[21] Appl. No.: 906,139

[22] Filed: Sep. 11, 1986

[51] Int. Cl.$^4$ .............................................. G05B 13/04
[52] U.S. Cl. .................................... 364/149; 318/561; 364/157
[58] Field of Search ............................ 364/149–157; 318/561

[56] References Cited

U.S. PATENT DOCUMENTS

| | | | |
|---|---|---|---|
| 3,287,615 | 11/1966 | Smyth | 318/28 |
| 3,509,326 | 4/1970 | Union | 235/151.1 |
| 3,648,031 | 3/1972 | Neal | 235/150.1 |
| 3,767,900 | 10/1973 | Chao et al. | 235/151.1 |
| 4,349,869 | 9/1982 | Prett et al. | 364/159 |
| 4,358,822 | 11/1982 | Sanchez | 364/151 |
| 4,385,362 | 5/1983 | Arcara | 364/572 |
| 4,539,633 | 9/1985 | Shigemasa et al. | 364/157 |
| 4,563,735 | 1/1986 | Hiroi et al. | 364/151 |
| 4,641,235 | 2/1987 | Shigemasa et al. | 364/149 |
| 4,679,136 | 7/1987 | Shigemasa | 364/157 |

OTHER PUBLICATIONS

Model Predictive Heuristic Control: Applications to Industrial Processes; Automatica, p. 413 14 (1978), Richalet et al.

Feedback and Optimal Sensitivity: Model Reference Transformations, Weighted Seminorms and Approximate Inverses; IEEE Trans. Aut. Control, p. 301, AC-26 (1981); Zames, G.

Multivariable Feedback Design: Concepts for a Classical/Modern Synthesis, IEEE Trans. Aut. Control, p. 4, AC-26 (1981), Doyle et al.

Internal Model Control, Parts 1, 2, & 3; Ind. Eng. Chem. Process Des. Dev., p. 308, 21 (1982); pp. 472 & 485, 24, 1985, Garcia et al.

Inferential Control of Processes, Parts I, II, & III; AIChE Journal, pp. 485, 492 & 500, 24, 1978, Joseph et al.

*Primary Examiner*—Jerry Smith
*Assistant Examiner*—Allen MacDonald
*Attorney, Agent, or Firm*—Rohm & Monsanto

[57] ABSTRACT

A robust model reference controller which supplies manipulated variables for controlling a multi-input multi-output process of the type which may not be modelled perfectly consists of a pre-compensator, a diagonal filter, and a post-compensator. The input signals to the robust model reference controller are first projected dynamically into decoupled signals by the pre-compensator. The diagonal filters then filter the decoupled signals individually. The filtered signals are projected back dynamically to the manipulated variables for the controlled process. The filter can easily be tuned to attain the optimal response of the closed-loop system with a given bound of model uncertainty.

14 Claims, 5 Drawing Sheets

ROBUST MODEL REFERENCE CONTROLLER

BACKGROUND OF THE INVENTION

1. Field of the Invention

This invention relates generally to a method and apparatus for controlling a multi-input multi-output process, and more particularly, to a method and apparatus for controlling a multi-input multi-output process which may not be modelled perfectly by the reference model. Such methods and apparatuses are useful in many diverse industrial fields, such as metallurgy, pulp and paper processing, petroleum refining, and chemical and pharmaceutical production.

2. Description of Prior Art

Model reference control system theory, whether it is adaptive or non-adaptive, is finding wide industrial applications in today's environment. Techniques under this framework include Model Algorithmic Control, Dynamic Matrix Control, Inferential Control and Internal Model Control, etc. The major advantages of this control system theory are as follows: both feedfoward and feedback control are incorporated naturally, the limitation on the closed-loop system response can be addressed directly based upon the reference model, and the controller can be designed in a straightforward manner to satisfy the closed-loop stability, zero-offset and constraint requirements. In accordance with the model reference control system theory, the controller is first constructed by inverting the invertible part of the reference model (i.e., the inverse must be stable and physically implementable), then a low pass diagonal filter is added externally to the controller so that the closed-loop system is stable if the controlled process is not modelled perfectly by the reference model (i.e., robust stability).

The foregoing procedure for satisfying the robust stability requirement generally detunes the closed-loop system response substantially if the reference model for the controlled process is ill-conditioned, or the ratio of the maximum singular value over the minimum singular value of the reference model is high. The present invention overcomes the aforementioned difficulty, in the framework of model reference control system theory, so that the optimal response of the closed-loop system with a given bound of model uncertainty, is feasible and easily achieved, while retaining the advantages of model reference control system theory.

SUMMARY OF THE INVENTION

It is an object of the present invention to provide a system for controlling a multi-input multi-output process which may not be modelled perfectly.

Another object is to provide control means so that the optimal response of the closed-loop system is feasible and easily achieved within a given bound of model uncertainty under the robust stability requirement.

Still another object of the invention is to provide a control system which retains the advantages of model reference control system theory.

Other objects and advantages of the invention will become apparent from the following description of the invention.

In accordance with the present invention, the robust model reference controller for controlling a multi-input multi-output process consists of a pre-compensator, a diagonal filter and a post-compensator. The input signals to the robust model reference controller, i.e., the input signals to the pre-compensator, are obtained according to model reference control system theory. This is achieved either by substracting estimated disturbance signals, which are equal to the controlled process output signals minus the reference model output signals from the command signals, and which are the desired controlled process output trajectories, or by substracting the reference model output signals from the error signals, which are equal to the command signals minus the controlled process output signals. The input signals to the pre-compensator are projected dynamically into decoupled signals. The diagonal filter then filters the decoupled signals individually. Such filtered signals are projected back dynamically to the manipulated variables for the controlled process. The diagonal filter is a low pass filter. The diagonal filter time constants, when properly adjusted, have the effect of optimizing the closed-loop system response for a given bound of model uncertainty.

The present invention uses a digital computer to control the multi-input multi-output process. The information contained in the pre-compensator, diagonal filter and post-compensator can be stored in the Random Access Memory (RAM) and can be updated adaptively. The computation is done at every sampling or control instant.

DETAILED DESCRIPTION OF THE PREFERRED EMBODIMENT

Figure 1:
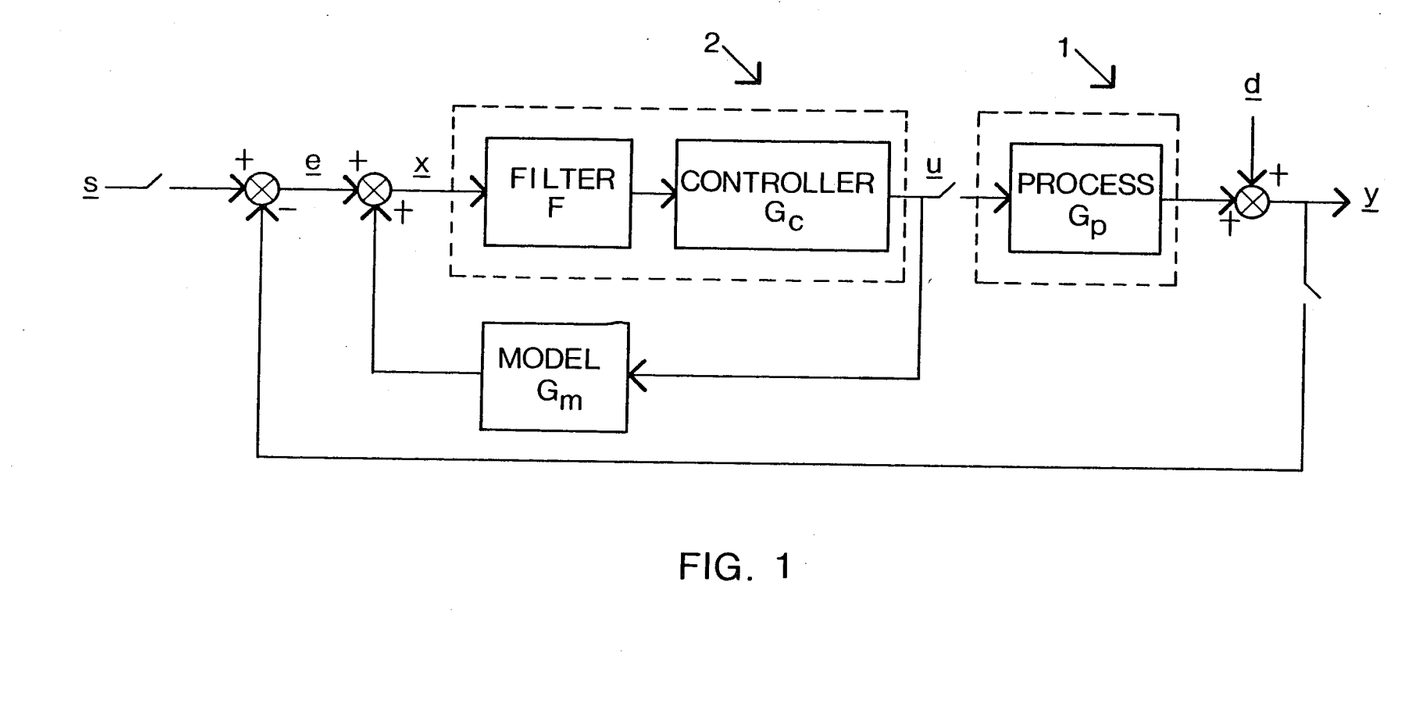
FIG. 1 is a schematic block diagram of a prior art model reference control system with an external filter.

Referring now to the drawings, wherein like reference numerals identify like elements, there is shown in FIG. 1 a block diagram of a prior art model reference control system. The error signals e, which are equal to the command signals s minus the controlled process output signals y, can be expressed as a function of the command signals s and the disturbance signals d by $$e = (I - G_m G_c F)(I + (G_p - G_m) G_c F)^{-1}(s - d) \qquad (1)$$

where $G_p$ is the controlled process, $G_m$ is the reference model, $G_c$ is the controller, I is the identity matrix and F is the diagonal filter.

Under the circumstance that the controlled process $G_p$ is equal to the reference model $G_m$, equation (1) is reduced to $$e = (I - G_m G_c F)(s - d) \qquad (2)$$

It should be clear to those skilled in the art that the controller $G_c$ should be designed as close as possible to be the inverse of the reference model $G_m$. The restrictions are that the controller $G_c$ must be stable and phyically implementable. The diagonal filter F is simply the identity matrix under this circumstance.

Figure 2:
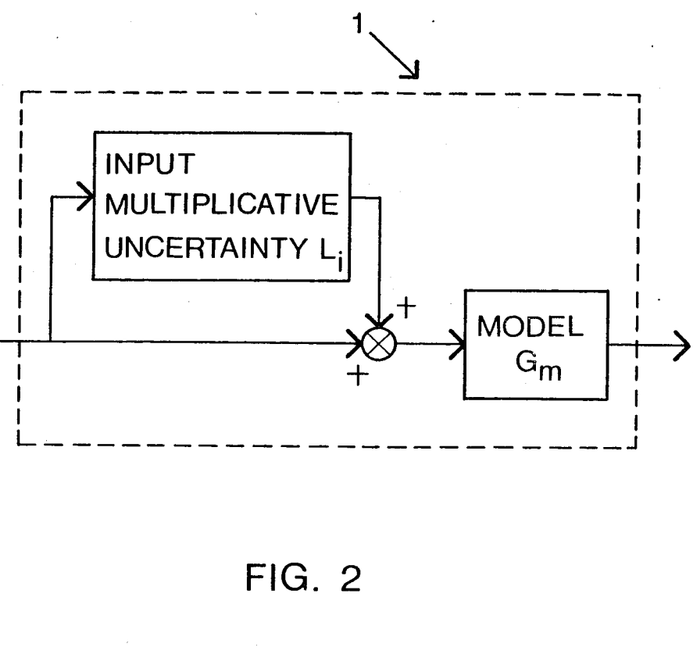
FIG. 2 is a block and line representation of the controlled process characterized by input multiplicative uncertainty.
Figure 3:
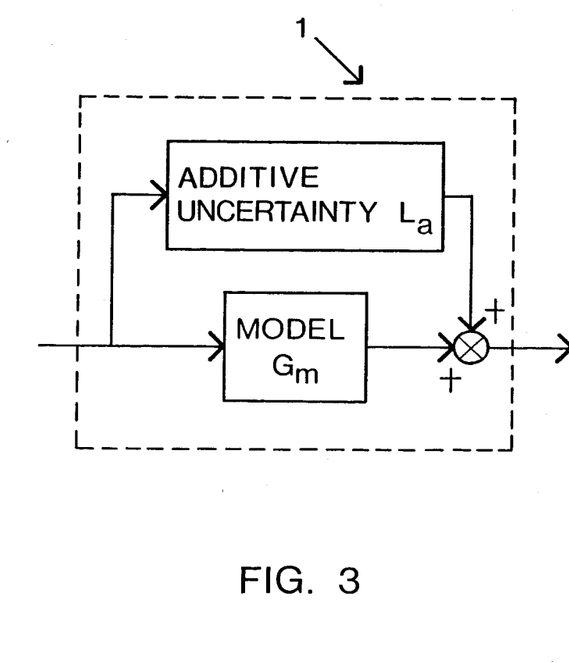
FIG. 3 is a block and line representation of the controlled process characterized by additive uncertainty.
Figure 4:
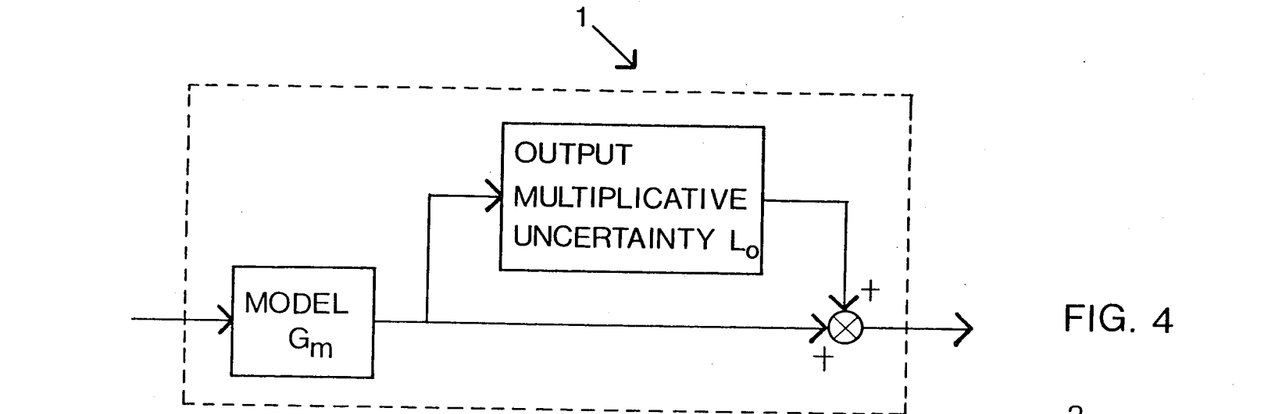
FIG. 4 is a block and line representation of the controlled process characterized by output multiplicative uncertainty.

In practice, no controlled process $G_p$ can be modelled perfectly. Block 1 in FIGS. 2-4 shows three types of model uncertainty which have appeared in the literature. They are expressed in the frequency domain.

$$G_m(iw)(I + L_i(iw)) = G_p(iw), \overline{\delta}(L_i(iw)) \leq B_i(iw) \qquad (3)$$

$$G_m(iw) + L_a(iw) = G_p(iw), \overline{\delta}(L_a(iw)) \leq B_a(iw) \qquad (4)$$

$$(I + L_o(iw))G_m(iw) = G_p(iw), \overline{\delta}(L_o(iw)) \leq B_o(iw) \qquad (5)$$

for $0 \leq w \leq \pi/T$
where $\overline{\delta}$ is the maximum singular value, $L_i(iw)$ is input multiplicative uncertainty, $L_o(iw)$ is output multiplicative uncertainty, $L_a$ is additive uncertainty, $B_o(iw)$, $B_i(iw)$ and $B_a(iw)$ are the corresponding model uncertainty bounds and T is the sampling time.

For model uncertainty characterized as above, the closed-loop system is stable if $$\overline{\delta}(G_p(iw) - G_m(iw))\overline{\delta}(G_c(iw))\overline{\delta}(F(iw)) < 1 \qquad (6)$$

for $0 \leq w \leq \pi/T$

From equation (6), it is clear that the maximum singular value of the filter F could be bounded by the maximum singular values of $G_p(iw) - G_m(iw)$ and $G_c(iw)$. Thus for a controller $G_c$ which is constructed by "inverting" an ill-conditioned reference model $G_m$, the filter F may need to be tuned such that the closed-loop system response becomes sluggish.

Figure 5:
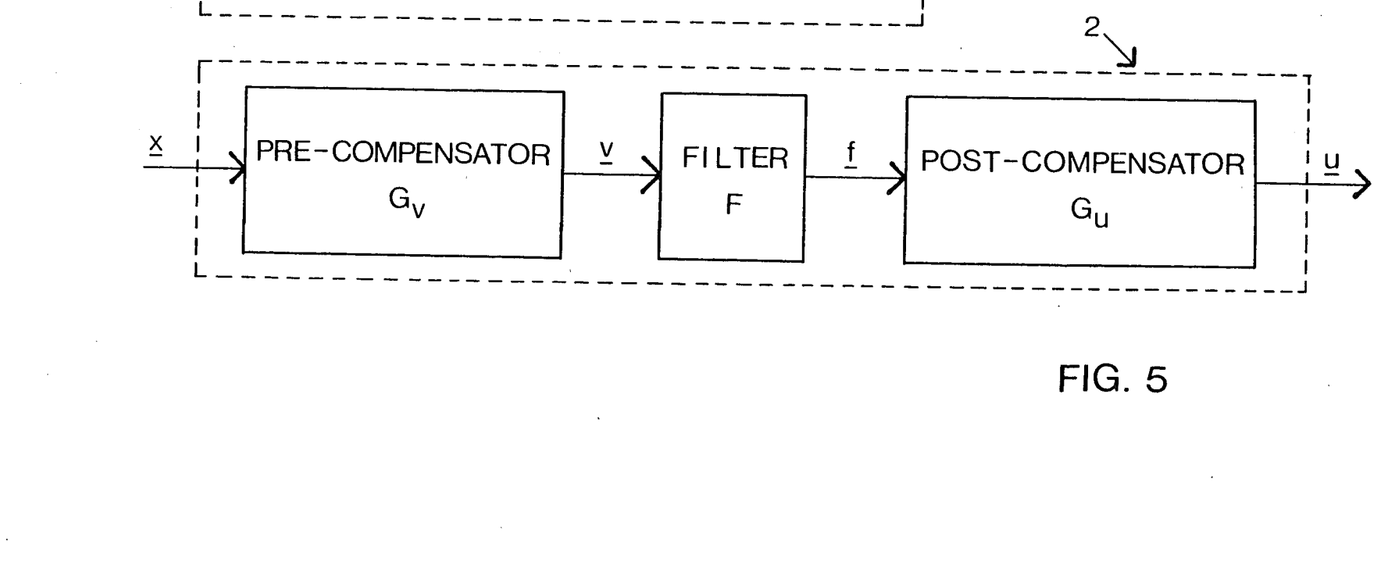
FIG. 5 is a schematic block diagram of a robust model reference controller.

Referring to FIG. 5, block 2 shows the present invention which partitions the controller $G_c$ into a pre-compensator $G_v$ and a post-compensator $G_u$ in a manner which will be described below, and the diagonal filter F is placed in between. The signals x are the input siganls to the pre-compensator $G_v$ and are projected dynamically into decoupled signals v. The filtered decoupled signals f are the output signals from filter F. The manipulated variables u are the output signals from post-compensator $G_u$.

Pre-compensator and Post-compensator

Figure 6:
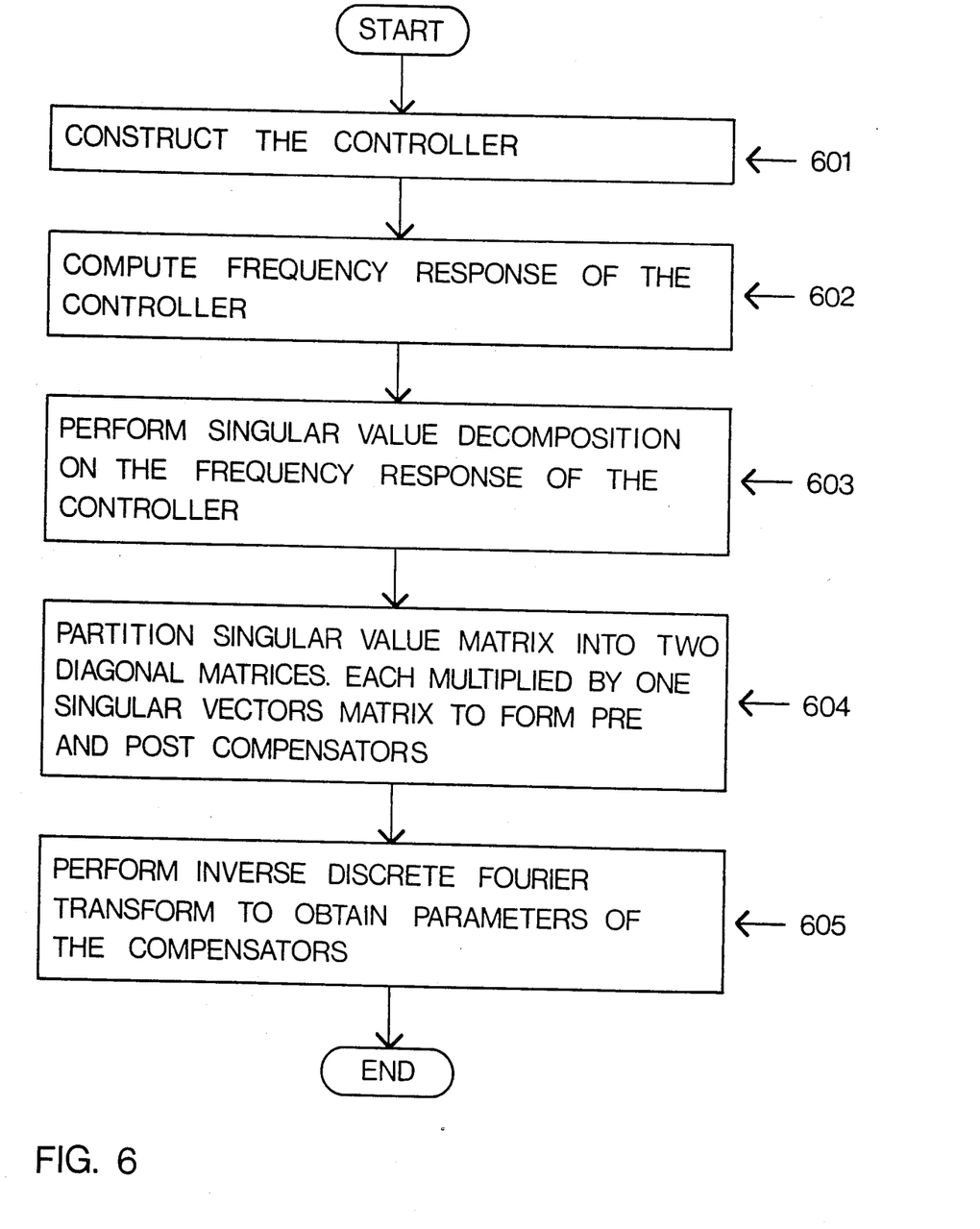
FIG. 6 is a flow chart of a system utilized to calculate parameters of the pre-compensator and the post-compensator.

With reference to FIG. 6, the partitioning of controller $G_c$ into a pre-compensator $G_v$ and a post-compensator $G_u$ can be made in accordance with the following procedure:

(1) At step 601, controller $G_c$ which can be constructed by one of the reference model control techniques mentioned before, i.e., Model Algorithmic Control, Dynamic Matrix Control, Inferential Control or Internal Model Control, etc. is obtained. These techniques are avaiable in the public literature.

(2) At step 602, the frequency response of controller $G_c$ is computed over a frequency range between 0 and $\pi/T$. The number of frequency points selected is not fixed, and can be selected by persons skilled in the art, as long as these points properly reflect the overall shape of the frequency response of controller $G_c$. For equally spaced frequency points, the increment between two consecutive points should be equal or less than $2\pi$ divided by the settling time of controller $G_c$ which is always finite, as required by model reference control system theory.

(3) At step 603, singular value decomposition is performed, or more specifically, singular value factorization is conducted on the frequency response of the controller $G_c$ at the selected frequency points. Thus at each frequency point, the frequency response of controller $G_c$ is decomposed into three matrices: the left singular vectors matrix, the singular value matrix, and the transpose of the right singular vectors matrix. Persons skilled in the art will readily understand that the columns of right and left singular vectors matrices are right and left singular vectors of controller $G_c$. The row dimension of the transpose of the right singular vectors matrix and the column dimension of the left singular vectors matrix are equal to the rank of controller $G_c$. The rank may be less than the row and column dimensions of controller $G_c$. The singular value matrix is diagonal and contains singular values of controller $G_c$.

(4) At step 604, the singular value matrix is partitioned into two diagonal matrices at the selected frequency points. The transpose of the right singular vectors matrix, multiplied by one of the diagonal matrices, constitutes the pre-compensator $G_v$. The left singular vectors matrix, multiplied by another diagonal matrix, constitutes the post-compensator $G_u$. The two diagonal matrices can be formed by calculating the square root of the singular value matrix. Step 604 thus generates the frequency responses of pre-compensator $G_v$ and post-compensator $G_u$.

(5) At step 605, an inverse discrete fourier transform is performed on the frequency responses of the pre-compensator $G_v$ and the post-compensator $G_u$ to obtain their impulse response coefficients. In the form of z-transform, the pre-compensator $G_v$ and the post-compensator $G_u$ can be expressed as $$G_v = \sum_{j=10}^{V} H_{v,j} z^{-j} \qquad (8)$$

$$G_u = \sum_{j=10}^{U} H_{u,j} z^{-j} \qquad (9)$$

where $H_{v,j}$ is the jth impulse response coefficient matrix for the pre-compensator $G_v$, $H_{u,j}$ is the jth impulse response coefficient matrix for the post-compensator $G_u$, V+1 and U+1 equal the number of impulse response coefficient matrices for the pre-compensator $G_v$ and post-compensator $G_u$, respectively. The impulse response coefficient matrices are the parameters which will be used to compute the manipulated variables u for the controlled process $G_p$, as will be described hereinbelow.

The parameters of the pre-compensator $G_v$ and the post-compensator $G_u$ can be stored in Random Access Memory and can be updated adaptively provided the control system is operated in an adaptive manner.

By virtue of the manner in which the pre-compensator $G_v$ and the post-compensator $G_u$ are constructed, input signals x of pre-compensator $G_v$ can be projected dynamically into decoupled signals v and filtered signals f from diagonal filter F can be projected back dynamically into the manipulated variables u. Thus the input/output relationship between the signals x and u can be treated as multiple single-input single-output systems. Consequently the design of diagonal filter F becomes straightforward.

Optimal Filter Tuning

In order to facilitate tuning, diagonal filter F can be a low pass filter with a general form expressed in z-transform as:

$$F = \text{diag}[(1-\epsilon_k)/(1-\epsilon_k z^{-1})]; \ 0 < \epsilon_k < 1, \ k=1, N \tag{10}$$

where $\epsilon_k$ is the time constant of the kth diagonal element of diagonal filter F and N is the rank of controller $G_c$.

Figure 7:
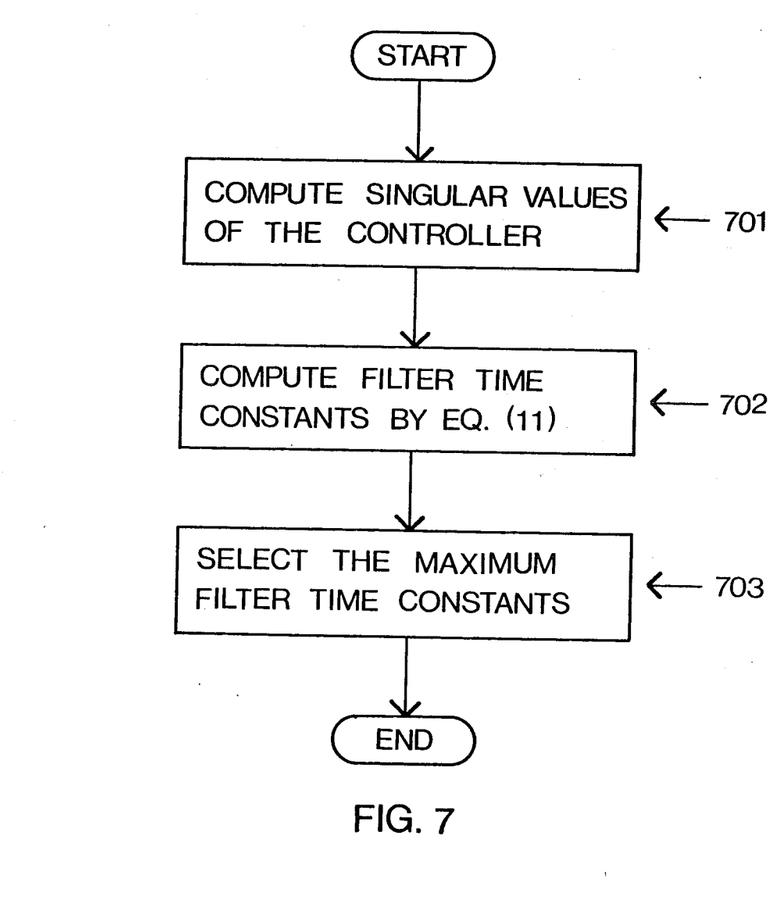
FIG. 7 is a flow chart of a system utilized to calculate diagonal filter time constants for attaining the optimal closed-loop system response with a given bound of model uncertainty.

Referring to FIG. 7, the filter time constants for attaining the optimal response of the closed-loop system with a given bound of model uncertainty can be obtained according to the following procedure:

(1) At step 701, the singular values of the controller $G_c$ over a frequency range between 0 and $\pi/T$ are computed, preferably at the same frequency points used in step 602.

(2) At step 702, the filter time constants $\epsilon_k$ for $k=1, N$ at the selected frequency points are computed based upon the following formula:

$$\overline{\delta(G_p(iw) - G_m(iw))} \delta_k(G_c(iw)) | [1 - \epsilon_k/1 - \epsilon_k e^{-iwT}] |; \\ k=1, N \tag{11}$$

at the selected frequency points,
where $\delta_k$ stands for the kth singular value.

Model uncertainty $G_p(iw) - G_m(iw)$ is characterized by equations (2)–(4).

(3) At step 703, the maximum $\epsilon_k$ is selected over the selected frequency points for $k=1, N$. The selected maximum filter time constants $\epsilon_k$ for $k=1, N$ are to be implemented.

The filter time constants may also be adjusted interactively by the operator.

Since diagonal filter F is placed between pre-compensator $G_v$ and post-compensator $G_u$, it becomes possible to tune the kth diagonal element of the filter F with respect to the kth singular value of controller $G_c$ individually. Persons skilled in the art will recognize that this has the effect of minimizing the filtering effort in order to satisfy the robust stability requirement with a given bound of model uncertainty. Thus, the closed-loop system response can be optimized in an easy and simple manner.

Computation of the Manipulated Variables

Figure 8:
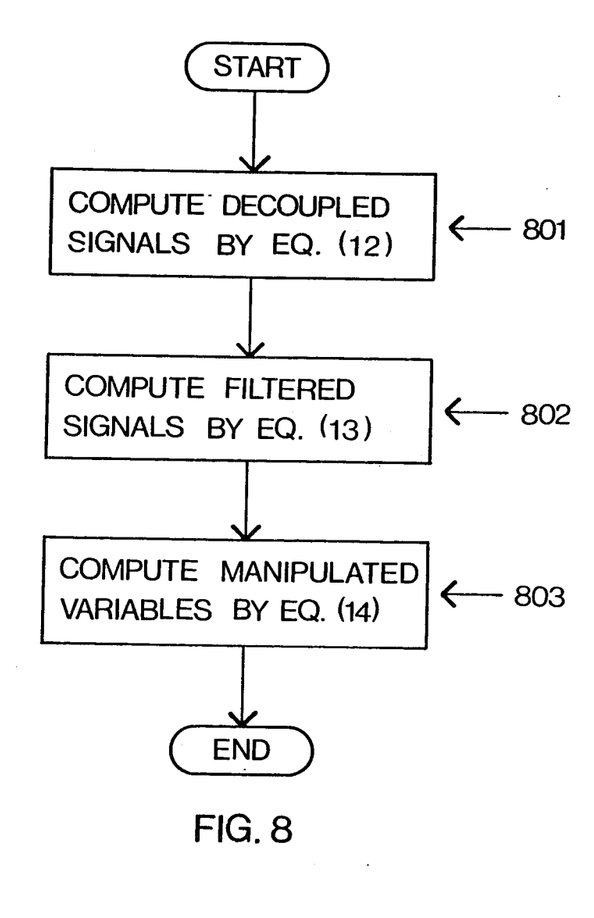
FIG. 8 is a flow chart of a system utilized to calculate the manipulated variables for the controlled processes from the input signals of the robust model reference controller.

Referring to FIG. 8, together with FIG. 5, computation of the manipulated variables u from signals x through pre-compensator $G_v$, diagonal filter F and post-compensator $G_u$ can be done according to the following procedure:

(1) At step 801, the decoupled signals v are computed via pre-compensator $G_v$ using the following formula:

$$v(l) = \sum_{j=0}^{V} H_{v,j} x(l-j) \tag{12}$$

where v(l) represents the value of decoupled signals v from pre-compensator $G_v$ at the current sampling instant l, and x(l−j) represents the value of input signals x to pre-compensator $G_v$ at the previous jth sampling instant.

(2) At step 802, the filtered decoupled signals f are computed via diagonal filter F using the following formula:

$$f_k(l) = (1-\epsilon_k)v_k(l) + \epsilon_k f_k(l-1); \ k=1, N \tag{13}$$

where subscript k stands for the kth element.

(3) At step 803, the current manipulated variables u(l) are computed via post-compensator $G_u$ using the following formula:

$$u(l) = \sum_{j=0}^{U} H_{u,j} f(l-j) \tag{14}$$

The computation of the manipulated variables u can be performed on-line and off-line.

From the foregoing description, it can be seen that a novel means for controlling a multi-input multi-output process has been developed. While the invention has been described with respect to one particular method and apparatus, it is apparent that other methods and other apparatuses will be obvious to those skilled in the art. Thus, the scope of the invention should not be limited by the foregoing description, but rather, only by reference to the claims appended hereto.

What is claimed is:

1. A method of controlling a multi-input multi-output process of the type which may be modelled imperfectly and which includes a controller with a filter and a reference model of the process, the improvement comprising the steps of:
    partitioning the controller into a pre-compensator and a post-compensator;
    applying input signals of the controller to said pre-compensator;
    generating dynamically decoupled signals;
    filtering said decoupled signals by the filter;
    applying the filtered signals from the filter to said post-compensator; and
    generating manipulated variables to the process.

2. The method of claim 1 wherein the transpose of the frequency response of said pre-compensator has the general form $[\eta_1(iw)v_1(iw), \ldots, \eta_N(iw)v_N(iw)]$ in which:
    $v_k(iw)$ = kth right singular vector of the frequency response of the controller at frequency w for $k=1, \ldots, N$;
    $\eta_k(iw)$ = the kth gain for $v_k$ at frequency w for $k=1, \ldots, N$; and
    N = the rank of the controller.

3. The method of claim 1 wherein the frequency response of said post-compensator has the general form in which:
    $u_k(iw)$ = kth left singular vector of the frequency response of the controller at frequency w for $k=1, \ldots, N$;
    $\mu_k(iw)$ = the kth gain for $u_k$ at frequency w for $k=1, \ldots, N$; and
    N = the rank of the controller.

4. The method of claim 1 wherein the filter is a diagonal filter.

5. The method of claim 1 wherein generating said decoupled signals comprises calculating, using said pre-compensator, the present said decoupled signals based on the present and past said input signals.

6. The method of claim 1 wherein generating said filtered signals comprises calculating, using the filter, the present said decoupled signals from said pre-compensator, and past said filtered signals from the filter.

7. The method of claim 1 wherein generating said manipulated variable comprises calculating, using said post-compensator, and the present and past said filtered signals from the filter.

8. An apparatus for controlling a multi-input multi-output process in which the process may be modelled imperfectly and the apparatus is of the type that includes a controller, the improvement comprising:
   said controller comprising a pre-compensator for generating dynamically decoupled signals;
   means for applying the input signals of said controller to said pre-compensator;
   filter means for filtering said decoupled signals to produce filtered signals; and
   said controller further comprising a post-compensator for receiving said filtered signals and for generating manipulated variables based on said filtered signals and for feeding said variables to said process.

9. The apparatus of claim 8 wherein the transpose of the frequency response of said pre-compensator has the general form $[\eta_1(iw)v_1(iw), \ldots, \eta_N(iw)v_N(iw)]$ in which:
   $v_k(iw)$ = kth right singular vector of the frequency response of the controller at frequency w for k = 1, ..., N;
   $\eta_k(iw)$ = the kth gain for $v_k$ at frequency w for k = 1, ..., N; and
   N = the rank of the controller.

10. The apparatus of claim 8 wherein the frequency response of said post-compensator has the general form in which:
    $u_k(iw)$ = kth left singular vector of the frequency response of the controller at frequency w for k = 1, ..., N;
    $\mu_k(iw)$ = the kth gain for $u_k$ at frequency w for k = 1, ..., N; and
    N = the rank of the controller.

11. The apparatus of claim 8 wherein said filter is a diagonal filter.

12. The apparatus of claim 8 wherein said pre-compensator is provided with means for calculating said decoupled signals in response to present and past ones of said input signals to said pre-compensator.

13. The apparatus of claim 8 wherein said filter is provided with means for calculating said filtered signals in response to a present one of said decoupled signals from said pre-compensator and a past one of said filtered signals.

14. The apparatus of claim 8 wherein said post-compensator is provided with means for calculating said manipulated variables in response to present and past ones of said filtered signals.

* * * * *

UNITED STATES PATENT AND TRADEMARK OFFICE
CERTIFICATE OF CORRECTION

PATENT NO. : 4,769,766
DATED : September 6, 1988
INVENTOR(S) : Hsien-Hsin Tung

It is certified that error appears in the above-identified patent and that said Letters Patent is hereby corrected as shown below:

Column 4, equation (8) and equation (9),
  change " j=10 " to -- j=0 --;

Column 4, line 66, after " $\underline{v}$ " insert -- , --;

Column 5, line 39, change " flter " to -- filter --;

Claim 3, line 2, after " form ",
  insert -- $[\mu_1(iw)\underline{u}_1(iw), \ldots, \mu_N(iw)\underline{u}_N(iw)]$ --

Claim 10, line 2, after " form ",
  insert -- $[\mu_1(iw)\underline{u}_1(iw), \ldots, \mu_N(iw)\underline{u}_N(iw)]$ --

Signed and Sealed this

Second Day of May, 1989

*Attest:*

DONALD J. QUIGG

*Attesting Officer*  *Commissioner of Patents and Trademarks*